United States Patent
Shibata et al.

(10) Patent No.: US 7,543,561 B2
(45) Date of Patent: Jun. 9, 2009

(54) SWIRL GENERATOR

(75) Inventors: Masumi Shibata, Chiryu (JP);
Kazushige Maruyama, Kariya (JP);
Suminobu Otsubo, Toyota (JP); Toshio Hayashi, Obu (JP)

(73) Assignees: Toyota Boshoku Kabushiki Kaisha, Aichi-ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/196,481

(22) Filed: Aug. 22, 2008

(65) Prior Publication Data
US 2009/0050105 A1 Feb. 26, 2009

(30) Foreign Application Priority Data
Aug. 24, 2007 (JP) ............................. 2007-218266

(51) Int. Cl.
*F02M 29/02* (2006.01)
*F02M 35/02* (2006.01)
(52) U.S. Cl. ...................... 123/306; 123/590
(58) Field of Classification Search ............ 123/306, 123/590, 592, 593; 60/902
See application file for complete search history.

(56) References Cited
U.S. PATENT DOCUMENTS
1,514,132 A * 11/1924 Cortelyou ................. 48/189.6
4,962,642 A * 10/1990 Kim ........................ 123/590
5,113,838 A * 5/1992 Kim ........................ 123/592
5,595,157 A * 1/1997 Siew et al. ................ 123/306
5,947,081 A * 9/1999 Kim ........................ 123/306

FOREIGN PATENT DOCUMENTS
JP         63-192951 A      8/1988
WO         WO 94/10437    *  5/1994

OTHER PUBLICATIONS
English language Abstract of JP 63-192951 A.

\* cited by examiner

*Primary Examiner*—Hieu T Vo
(74) *Attorney, Agent, or Firm*—Greenblum & Bernstein, P.L.C.

(57) ABSTRACT

A swirl generator is arranged in a duct through which air is sent from the exterior to an air cleaner. The swirl generator has a plurality of guide vanes, which change the flow direction of an air flow. Each of the guide vanes has a guide fin that adjusts the air flow and a deflecting fin that applies swirl force to the air flow. The deflecting fin is configured by an upstream portion and a downstream portion, which are connected together at a predetermined angle. The upstream portion and the downstream portion each have a cross section extending linearly along a cylindrical plane coaxial with a nose cone.

9 Claims, 6 Drawing Sheets

SWIRL GENERATOR

BACKGROUND OF THE INVENTION

The present invention relates to a swirl generator that centrifugally isolates dust particles from air to be fed to an engine and draws the air free from the dust particles to an air cleaner body.

As shown in FIG. 9, this type of air cleaner mainly includes an inlet duct 85, a pre-cleaner 81, and an air cleaner body 86. A swirl generator 80 is located in the pre-cleaner 81. The swirl generator 80 applies swirl force to air 84 that has been introduced into the inlet duct 85. The air 84 thus forms a swirl flow 82. In this state, dust particles contained in the air 84 receive centrifugal force and thus move from the center of the pre-cleaner 81 toward an inner wall of the duct 71. The air 84 thus flows from the left-hand side to the right-hand side as viewed in FIG. 9 and is then sent to the engine. After having reached the vicinity of the inner wall of the duct 71, the dust particles in the air 84 are collected by a dust discharge valve 83, which is located below the duct 71, and then discharged to the exterior of the duct 71. A filter element 88 is arranged in the air cleaner body 86. The filter element 88 removes smaller-sized dust particles from the air 84. In this manner, clean air 89 is supplied to the engine.

For example, Japanese Laid-Open Patent Publication No. 63-192951 discloses a pre-cleaner having a swirl generator. As shown in FIG. 10A, the swirl generator 80 described in this document includes a central portion having a nose cone 91, an outer circumferential portion having a cylindrical ring 92, and a plurality of guide vanes 90, which are provided between the central portion and the outer circumferential portion. The guide vanes 90 are spaced at equal intervals. As shown in FIGS. 10B and 10C, a guide fin 95 is located in an upstream portion of each of the guide vanes 90. A deflecting fin 93 is arranged in a downstream portion of each guide vane 90. Each of the deflecting fins 93 is inclined at a predetermined angle with respect to the corresponding one of the guide fins 95. Each guide fin 95 adjusts the flow of the air 84. The corresponding deflecting fin 93 then changes the flow direction of the air 84. As a result, the swirl flow 82 is formed by the air 84.

The output performance of an engine of a vehicle has been significantly improved in recent years. The engine thus requires a correspondingly increased air supply. However, the size of the vehicle is substantially unchanged before and after such improvement and the engine compartment has only limited space for accommodating devices of an intake system. Yet, a greater number of auxiliary devices must be received in the engine compartment. Thus, to ensure a higher output of the engine, the inner diameters of the intake ducts may be equalized to raise the flow rate of the air sent to the engine. If the swirl generator 80, which is a conventional type, is used to remove dust particles from the air that flows at a higher flow rate, the flow of the air may be separated from the joint portions between the guide fins 95 and the corresponding deflecting fins 93. This not only generates noise in an intake pipe but also disadvantageously influences an engine control system. Specifically, separation of the air flow from the joint portions causes erroneous operation of an air flowmeter, which detects an intake air amount, or loss of the output of the engine due to decreased air intake efficiency. Also, the separation of the air flow hampers the generation of a swirl flow. Dust isolating performance of the swirl generator 80 is thus lowered.

To suppress such separation of the air flow, the angle between each guide fin 95 and the corresponding deflecting fin 93 may be decreased. However, this decreases swirl forming performance of the deflecting fins 93.

SUMMARY OF THE INVENTION

Accordingly, it is an objective of the present invention to provide a swirl generator that effectively isolates dust particles from air being drawn at a high speed and prevents the generation noise and pulsation.

To achieve the foregoing objective and in accordance with one aspect of the present invention, a swirl generator arranged in an air passage extending to a filter element of an air cleaner is provided. The swirl generator includes a central shaft body and a plurality of guide vanes arranged around the central shaft body. Each of the guide vanes has a guide fin that adjusts an air flow and a deflecting fin applying a swirl force to the air flow. The deflecting fin is slanted with respect to the guide fin at a downstream side of the guide fin. The deflecting fin is configured by a plurality of deflecting portions. Each of the deflecting portions has a cross section extending linearly along a cylindrical plane coaxial with the central shaft body. The deflecting portions are connected together while being slanted with respect to a flow direction of the air flow.

DETAILED DESCRIPTION OF THE PREFERRED EMBODIMENTS

First Embodiment

Figure 1A:
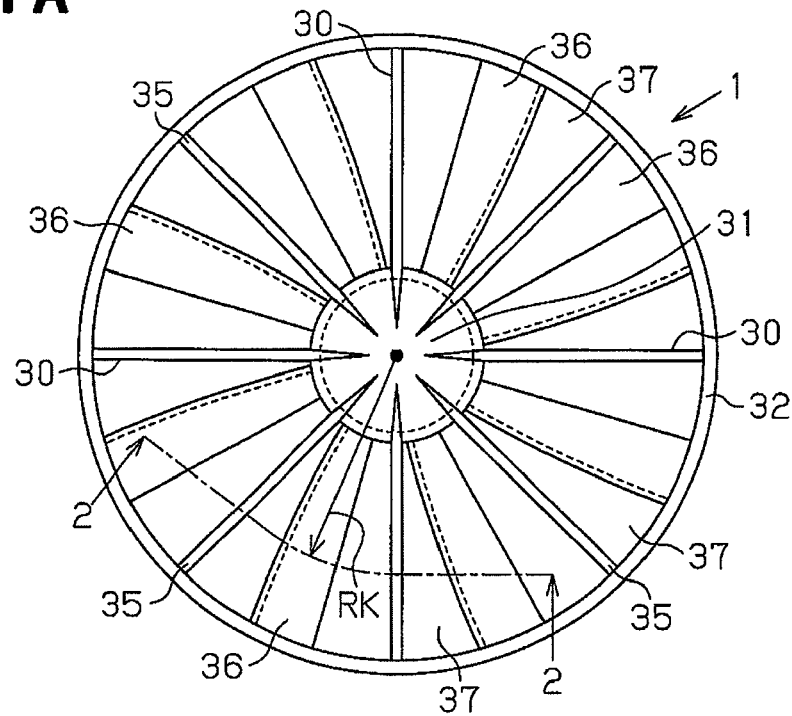
FIG. 1A is a top view showing a swirl generator according to a first embodiment of the present invention.

A swirl generator according to a first embodiment of the present invention will now be described with reference to FIGS. 1 to 7. Same or like reference numerals are given to components of the first embodiment that are the same as or like corresponding components of the prior art.

Figure 3:
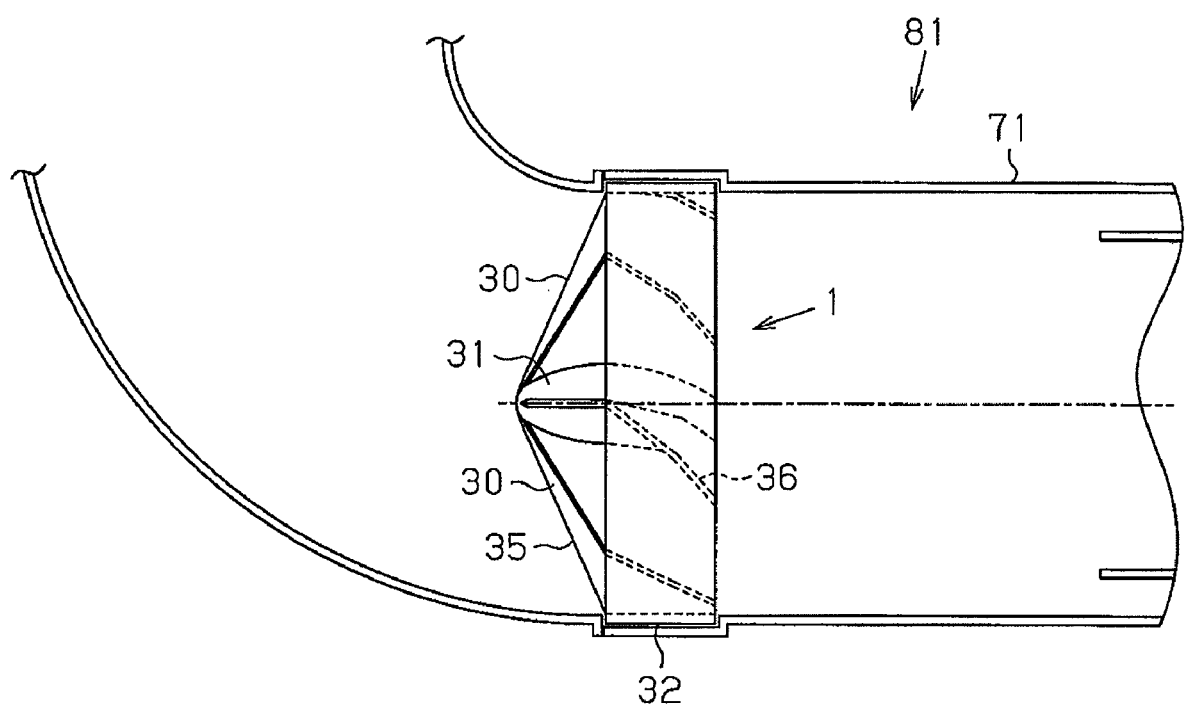
FIG. 3 is a side view showing the swirl generator incorporated in a duct.
Figure 4:
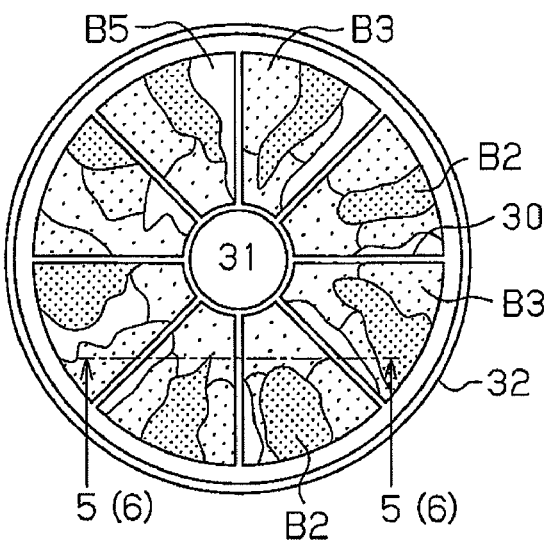
FIG. 4 is a diagram schematically representing a simulation result of an air flow.
Figure 9:
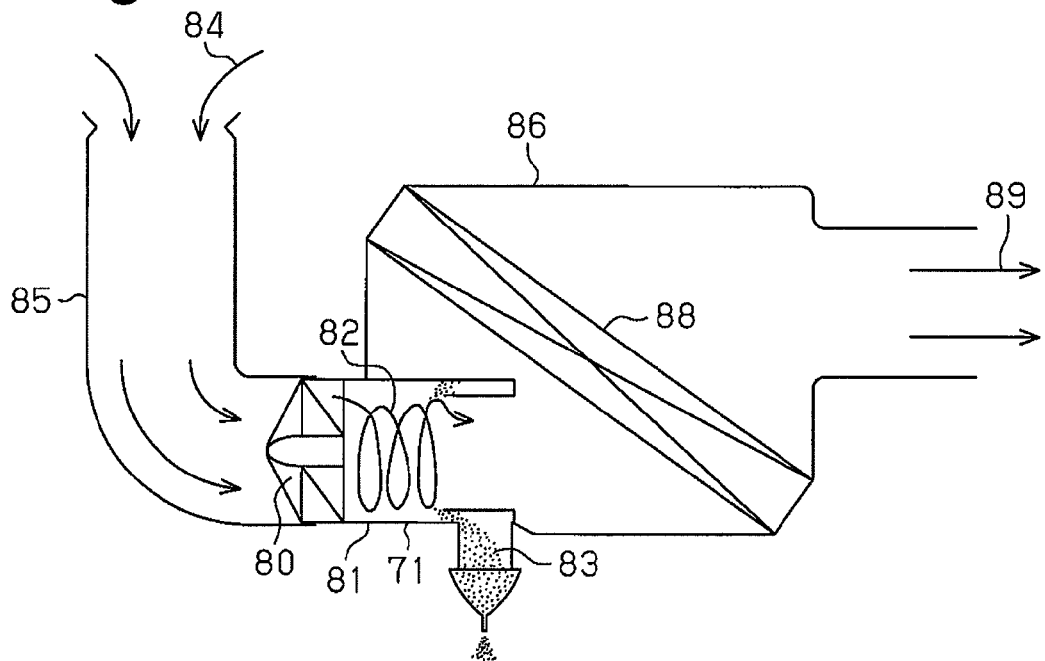
FIG. 9 is a view schematically showing a conventional air cleaner as a whole.

As shown in FIG. 9, a swirl generator 1 is incorporated in a duct 71. The duct 71 forms an air passage extending to a filter element 88 in a air cleaner body 86. As shown in FIG. 3, the swirl generator 1 has a nose cone 31, a ring 32, and a plurality of guide vanes 30. The nose cone 31 configures a central shaft body of the swirl generator 1. The guide vanes 30 are arranged between the nose cone 31 and the ring 32. The guide vanes 30 are formed integrally with the nose cone 31 and the ring 32. A guide fin 35 is located in an upstream portion of each of the guide vanes 30. A deflecting fin 36 is arranged in a downstream portion of each guide vane 30. Each of the guide fins 35 is formed integrally with the corresponding one of the deflecting fins 36. The outer circumferential surface of the ring 32 is bonded with the inner circumferential surface of the duct 71. The swirl generator 1 is formed of plastic.

Figure 1B:
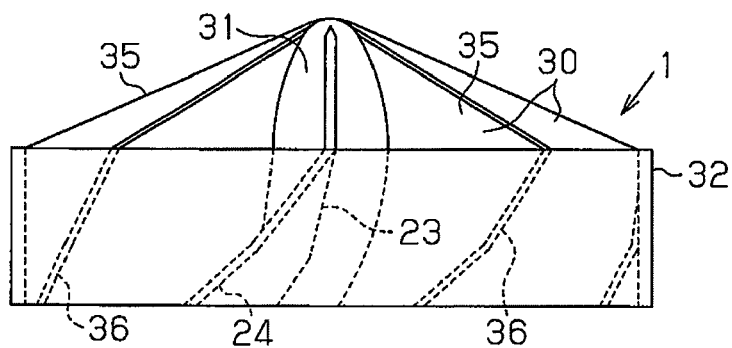
FIG. 1B is a side view showing the swirl generator.

As shown in FIG. 1B, a distal portion of the nose cone 31 is formed in a bullet-like shape. A proximal portion of the nose cone 31 is formed in a cylindrical shape. The ring 32 is formed in a cylindrical shape having a height equal to the height of each deflecting fin 36. The nose cone 31 is arranged coaxially with the ring 32. With the swirl generator 1 incorporated in the duct 71, the nose cone 31 is arranged coaxially with the duct 71. A total of eight guide vanes 30 are provided. The guide vanes 30 are spaced at equal intervals around the nose cone 31. A clearance 37 is defined between each adjacent pair of the guide vanes 30.

Each of the guide fins 35 is shaped substantially like a triangular plate. Each guide fin 35 is connected to the vertex and the side surface of the nose cone 31 and the upper end of the corresponding deflecting fin 36. The guide fin 35 extends in a radial direction of the nose cone 31 and is arranged parallel with the axis of the nose cone 31. This causes the guide fin 35 to adjust the flow of air in the duct 71 to be directed along the axis of the duct 71.

Figure 2:
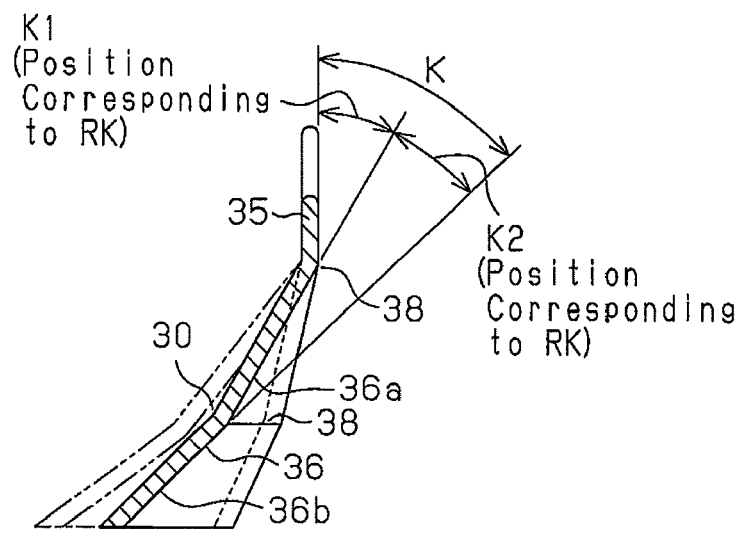
FIG. 2 is a cross-sectional view taken along line 2-2 of FIG. 1.

As illustrated in FIG. 2, each of the deflecting fins 36 is connected to the corresponding one of the guide fins 35 at a predetermined angle. Each deflecting fin 36 has two deflecting portions, which are an upstream portion 36a and a downstream portion 36b. The upstream portion 36a and the downstream portion 36b both have a cross section extending linearly. The downstream portion 36b is connected to the associated upstream portion 36b through a connecting portion 38 having a ridge line, at a predetermined angle.

FIG. 2 is a cross-sectional view showing a guide vane 30, as taken along a cylindrical plane with a radius RK coaxial with the nose cone 31 (line 2-2 of FIG. 1A). In FIG. 2, a single deflecting fin 36 is illustrated. The upstream portion 36a and the downstream portion 36b of the deflecting fin 36 each have a cross section extending linearly along a cylindrical plane having an axis coinciding with the axis of the nose cone 31. The upstream portion 36a and the downstream portion 36b are connected together at a predetermined angle. As shown in FIG. 2, the upstream portion 36a is connected to the guide fin 35 at a first angle K1=30°. The downstream portion 36b is connected to the upstream portion 36a at a second angle K2=20°. Thus, the sum of the first and second angles K1, K2, or an inclination angle of the downstream portion 36b with respect to the guide fin 35, is 50°.

The first angle K1 with respect to the axis of the nose cone 31 becomes smaller toward the axis of the nose cone 31 and greater toward the ring 32. In other words, the inclination angle of the upstream portion 36a with respect to the air flow becomes smaller toward the axis of the nose cone 31 and greater toward the ring 32. Similarly, the second angle K2 with respect to the axis of the nose cone 31 becomes smaller toward the axis of the nose cone 31 and greater toward the ring 32. In other words, the inclination angle of the downstream portion 36b with respect to the air flow becomes smaller toward the axis of the nose cone 31 and greater toward the ring 32. However, the first and second angles K1, K2 are both less than 45° at positions closest to the ring 32. The sum of the first and second angles K1, K2 is thus less than 90°. Further, it is preferred that the sum of the first and second angles K1, K2 be 45° or greater at the ends closest to the ring 32.

In the swirl generator 1, the flow of the air drawn through operation of the engine is adjusted by the guide fins 35. The flow direction of the air is then changed by the deflecting fins 36. As a result, a swirl flow of the air is generated and the dust particles are centrifugally isolated from the air flow.

The swirl generator has the following advantages.

(1) Each deflecting fin 36 is formed by the upstream portion 36a and the downstream portion 36b, which are connected together at a predetermined angle. The upstream portion 36a and the downstream portion 36b both have a cross section extending linearly along a cylindrical plane coaxial with the nose cone 31. In this case, on the cylindrical plane with the radius RK, the deflecting fin 36 is inclined at the first angle K1+the second angle K2 (=50°) with respect to the axis of the duct 71. However, the upstream portion 36a of the deflecting fin 36 is inclined only at 30° with respect to the guide fin 35 located adjacent to the upstream portion 36a. The downstream portion 36b is inclined only at 20° with respect to the upstream portion 36a adjacent to the downstream portion 36b. This maximally suppresses separation of the air flow from the deflecting fins 36 even if the air flow proceeds to the engine at a high speed. The dust particles are thus efficiently isolated. As a result, generation of noise, disadvantageous influence on the engine control system, pulsation and vibration of intake system components are thus suppressed. In other words, the swirl generator 1 with reduced pressure loss is provided.

(2) Each guide fin 35 is formed by a flat plate parallel with the axis of the nose cone 31. The upstream portion 36a and the downstream portion 36b both have a cross section extending linearly along a cylindrical plane coaxial with the nose cone 31. This makes it easy to machine a molding surface of a mold in which the swirl generator is to be formed.

Computer simulated formation of a swirl flow using an example of the swirl generator 1 and a comparative example will hereafter be explained.

EXAMPLE

The example used in the simulation met the following conditions.

The radius (the inner diameter) of the ring 32=32.75 mm

The first angle K1 (on the circle with the radius RK=25 mm) =30°

The second angle K2 (on the circle with the radius RK=25 mm)=20°

The diameter of the nose cone 31=25 mm

The height of the ring 32 (the deflecting fin 24)=22.4 mm

The inner diameter of the duct 71× the length of the duct 71 =99×140 mm

The intake air amount=15 m³/min

Figure 5:
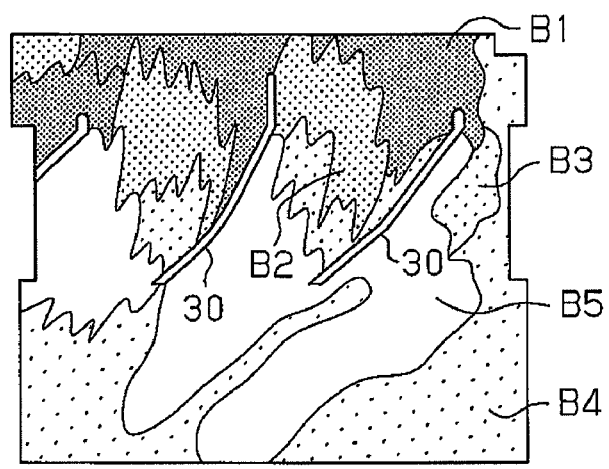
FIG. 5 is a diagram schematically representing a simulation result of an air flow in an example of the first embodiment.

FIG. 5 represents the result of the simulation with the example. FIG. 5 is a cross-sectional view taken along line 5-5 of FIG. 4. In the portions B1 to B5 of FIG. 4, the speed of the air flow becomes lower as the dot density becomes greater. In other words, in the dot-free portion (B5), the speed of the air flow is maximally high. The air thus flows smoothly and forms a laminar flow.

With reference to FIG. 5, according to the result of the simulation with the example, the light-toned portion B5 (the laminar flow range) extends from the backside to the downstream side of each deflecting fin 36. It is thus assumed that, in the example, the air flow does not separate from the deflecting fins 36.

Figure 7A:
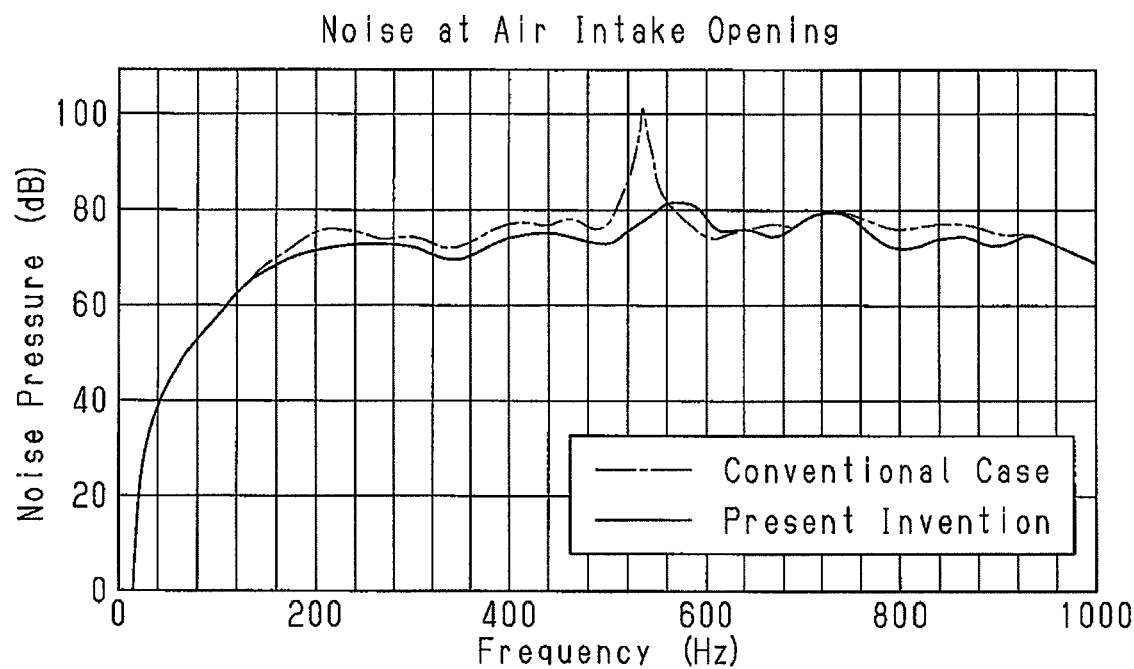
FIG. 7A is a graph representing the sound pressure measurements of the example and the comparative example.
Figure 7B:
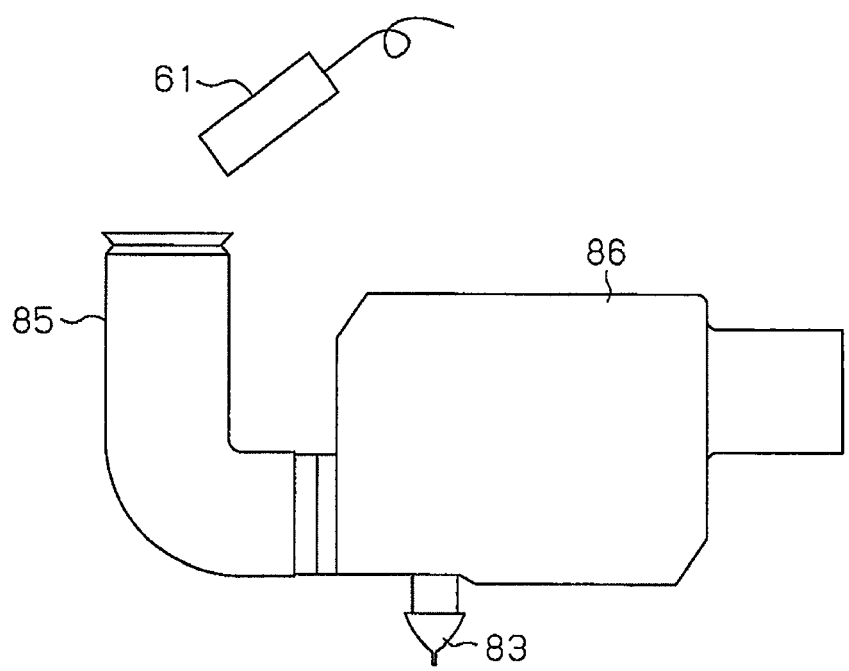
FIG. 7B is a front view illustrating a method for measuring the sound pressure.

In FIG. 7A, the solid line represents the actual measurement of the sound pressure produced by the air flow in the example. In such measurement, a microphone 61 was installed to face the opening of an inlet duct 85, as illustrated in FIG. 7B. As is clear from FIG. 7A, no peak was observed with the sound pressure at any frequency. Also, no annoying whistling sound was heard by the observer.

COMPARATIVE EXAMPLE

Figure 10A:
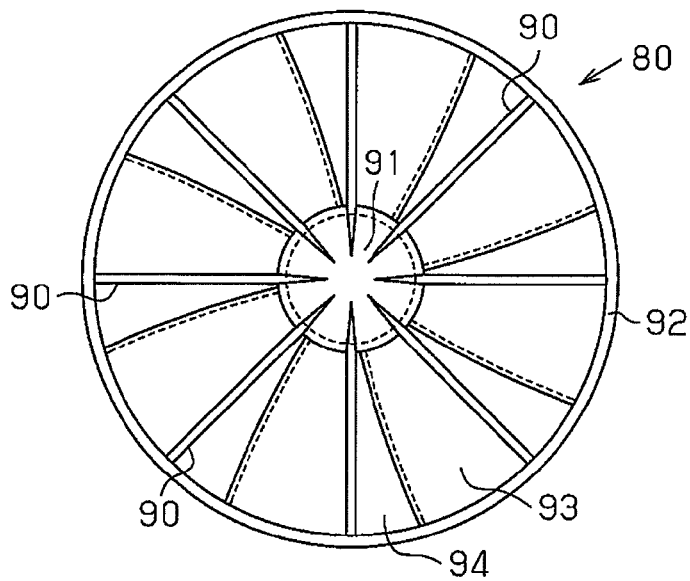
FIG. 10A is a top view showing the conventional swirl generator.
Figure 10C:
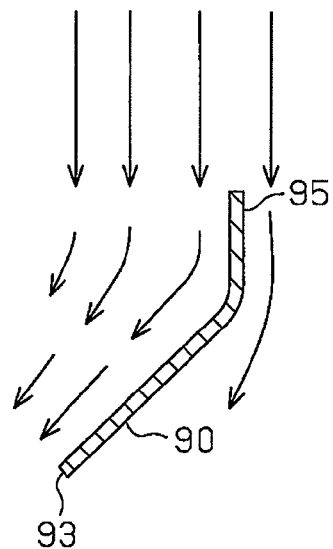
FIG. 10C is a cross-sectional view schematically showing fins and air flows in the vicinities of the fins.
Figure 10B:
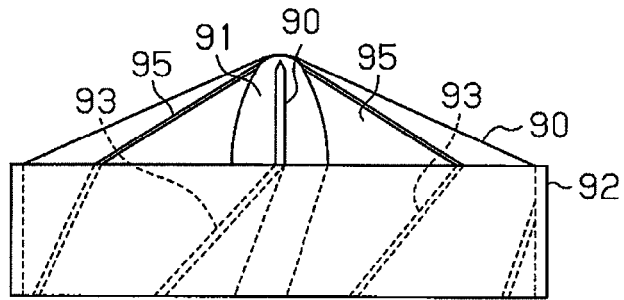
FIG. 10B is a side view showing the swirl generator.

Another simulation was performed using the conventional swirl generator 80, which is shown in FIGS. 10A to 10C, as a comparative example. The simulation with the comparative example was performed on the conditions equivalent to those of the simulation with the example except for the first angle K1 (RK)=45° and the second angle K2 (RK)=0°.

Figure 6:
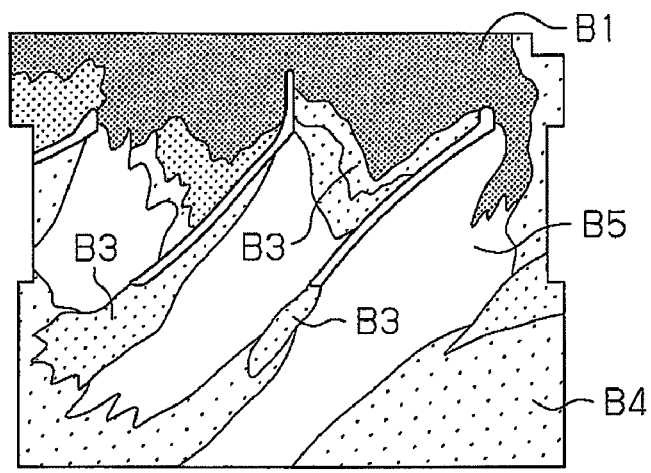
FIG. 6 is a diagram schematically representing a simulation result of an air flow in a comparative example.

FIG. 6 represents the result of the simulation with the comparative example. FIG. 6 is a cross-sectional view taken along line 6-6 of FIG. 4.

With reference to FIG. 6, according to the result of the simulation with the comparative example, the slightly dark toned portion B3, or a range corresponding to a slightly lower speed of the air flow, was observed in a range extending from the backside to the downstream side of the deflecting fin 93. As a result, it is assumed that, in the comparative example, separation of the air flow from the deflecting fins 36 or stagnation of the air flow in the vicinities of the deflecting fins 36 are brought about.

In FIG. 7A, the dashed dotted chain line represents the actual measurement of the sound pressure produced by the air flow in the comparative example. As is clear from FIG. 7A, a peak was observed with the sound pressure in a range of a frequency exceeding 500 Hz. Further, an annoying whistling sound was heard by the observer.

[Consideration]

According to the simulation results, the air flow separation occurred when the first angle K1 was 45°. It is thus clear that, if the angle of each deflecting fin is set to a value greater than or equal to 45°, the air flow separates from the deflecting fins 93.

In other words, by setting the maximum value of the first angle K1 and the maximum value of the second angle K2 both to a value less than 45°, the air flow is prevented from separating from the deflecting fins 36.

Further, if the sum of the first angle K1 and the second angle K2 exceeds 90°, a generated swirl flow has an exceedingly great swirl angle with respect to the axis of the duct. This may cause a backflow or a flow similar to a backflow of the air in the swirl generator. Such flow causes pressure loss in intake system ducts, which is undesirable. It is thus preferred that the sum of the first angle K1 and the second angle K2 be set to a value greater than or equal to 45° and smaller than 90°. In this case, the sum of the first and second angles K1 and K2 is selected with the maximum intake air amount of the engine or the like taken into consideration.

Second Embodiment

A swirl generator according to a second embodiment of the present invention will hereafter be explained. The explanation focuses mainly on the differences between the second embodiment and the first embodiment.

Figure 8:
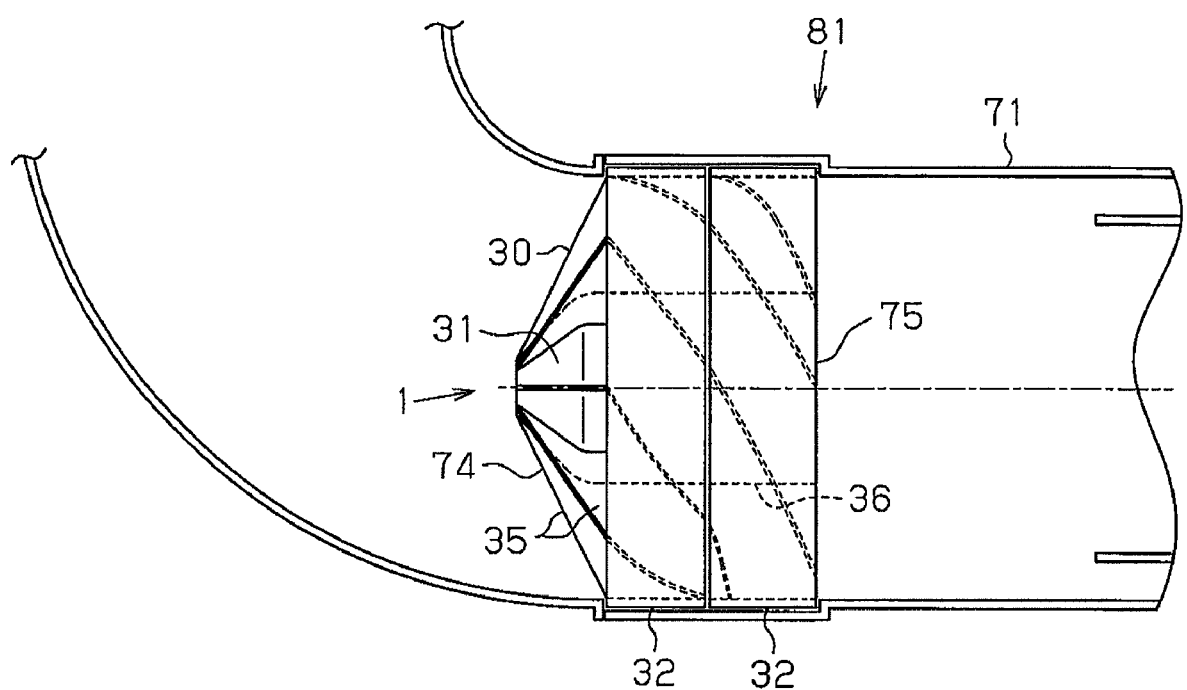
FIG. 8 is a side view showing a swirl generator according to a second embodiment of the present invention.

As shown in FIG. 8, the swirl generator 1 is formed by two separate members 74, 75, which are connected in series. The separate members 74, 75 are divided from each other along a plane perpendicular to the axis of the nose cone 31. The distal portion of the nose cone 31 and the guide fins 35 are arranged solely in the separate member 74.

The second embodiment has the following advantage.

(3) If, for example, the swirl generator 1, which has an elongated shape extending along the axis of the swirl generator 1, does not have a divided structure and the upstream opening end and the downstream opening end of each clearance 37 between the corresponding adjacent pair of the deflecting fins 36 are circumferentially offset from each other, the opening ends cannot be located at the mutually opposing positions. In this case, an axially separable mold cannot be used to form the swirl generator 1. Configuration of the mold for shaping the swirl generator 1 is thus restricted. However, according to the second embodiment, the swirl generator 1 is formed by joining the two separate members 74, 75 with each other. This allows separate formation of the two separate members 74, 75. The swirl generator 1 having an elongated shape extending along the axis of the nose cone 31 is thus formed. In other words, there is no limitation on the configuration of a usable mold. As a result, the deflecting fins 36 each having an axially elongated shape are provided. This provides a high-performance swirl generator 1 that efficiently generates a swirl flow and prevents separation of an air flow.

The first and second embodiments may be modified as follows.

In each of the first and second embodiments, a total of eight deflecting fins 36 are provided. However, the number of the deflecting fins 36 may be less than eight or more than or equal to nine.

Although the swirl generator 1 of each of the first and second embodiments is a molded product formed of plastic, the swirl generator 1 may be a die-cast product formed of non-iron type metal or an assembled product formed by steel plates.

In each of the first and second embodiments, the upstream portion 36a and the downstream portion 36b are connected together through the connecting portion 38 having a ridge line. However, such connection may be brought about through an arcuate connecting portion 38 having a predetermined radius of curvature.

Although each deflecting fin 36 of the first and second embodiments has two deflecting portions, the deflecting fin 36 may have three or more deflecting portions. In this case, each of the deflecting portions has a cross section extending linearly along a cylindrical plane having an axis coinciding with the axis of the nose cone. It is preferred that the angle of each deflecting portion with respect to an adjacent deflecting portion be less than 45°.

Although the ring 32 of the swirl generator 1 is provided as a separate body from the duct 71 in the first and second embodiments, the ring 32 may be omitted and the guide vanes 30 may be formed in the duct 71.

The swirl generator 1 of each of the first and second embodiments may be incorporated in the inlet of the air cleaner body 86.

In the second embodiment, the swirl generator 1 may have a divided structure having three or more components.

The invention claimed is:

1. A swirl generator arranged in an air passage extending to a filter element of an air cleaner, the swirl generator comprising:

a central shaft body; and a plurality of guide vanes arranged around the central shaft body, wherein each of the guide vanes has a guide fin that adjusts an air flow and a deflecting fin applying a swirl force to the air flow, wherein the deflecting fin is slanted with respect to the guide fin at a downstream side of the guide fin, wherein the deflecting fin is configured by a plurality of deflecting portions, wherein each of the deflecting portions has a cross section extending linearly along a cylindrical plane coaxial with the central shaft body, and wherein the deflecting portions are connected together while being slanted with respect to a flow direction of the air flow.

2. The swirl generator according to claim 1, wherein an inclination angle between the guide fin and the deflecting fin and an inclination angle between each adjacent pair of the deflecting portions are both less than 45°.

3. The swirl generator according to claim 2, wherein the sum of the inclination angles in a single guide vane is not less than 45° and not more than 90°.

4. The swirl generator according to claim 1, wherein the swirl generator is divided along a plane perpendicular to the axis of the central shaft body.

5. The swirl generator according to claim 4, wherein the swirl generator is provided by forming a plurality of separate members independently from one another and joining the separate members together.

6. The swirl generator according to claim 1, wherein an inclination of each deflecting portion with respect to the axis of the central shaft body becomes smaller toward the axis of the central shaft body.

7. The swirl generator according to claim 1, wherein the guide fin is formed integrally with the deflecting fin.

8. The swirl generator according to claim 1, further comprising a ring arranged coaxially with the central shaft body, the ring being arranged in such a manner that the guide vanes are arranged between the ring and the central shaft body.

9. The swirl generator according to claim 8, wherein the guide vanes are formed integrally with the central shaft body and the ring.

* * * * *